US008861445B2

(12) United States Patent
Jing et al.

(10) Patent No.: US 8,861,445 B2
(45) Date of Patent: Oct. 14, 2014

(54) MULTI-CHANNEL SINGLE RADIO COMMUNICATION IN HOME MESH NETWORK

(75) Inventors: Xiangpeng Jing, San Diego, CA (US); Abhishek Patil, San Diego, CA (US); Aixin Liu, San Diego, CA (US); Djung N. Nguyen, San Diego, CA (US)

(73) Assignees: Sony Cororation, Tokyo (JP); Sony Electronics Inc., Park Ridge, NJ (US)

( * ) Notice: Subject to any disclaimer, the term of this patent is extended or adjusted under 35 U.S.C. 154(b) by 605 days.

(21) Appl. No.: 12/402,414

(22) Filed: Mar. 11, 2009

(65) Prior Publication Data

US 2010/0232369 A1  Sep. 16, 2010

(51) Int. Cl.
| | |
|---|---|
| *H04B 7/14* | (2006.01) |
| *H04J 1/10* | (2006.01) |
| *H04J 3/08* | (2006.01) |
| *H04W 4/00* | (2009.01) |
| *H04H 20/67* | (2008.01) |
| *H04W 72/04* | (2009.01) |
| *H04W 74/08* | (2009.01) |
| *H04W 84/18* | (2009.01) |

(52) U.S. Cl.
CPC ........ *H04W 72/0486* (2013.01); *H04W 74/085* (2013.01); *H04W 84/18* (2013.01)
USPC ........... 370/329; 370/315; 370/327; 370/328; 370/330; 370/338; 370/339

(58) Field of Classification Search
None
See application file for complete search history.

(56) References Cited

U.S. PATENT DOCUMENTS

| | | | |
|---|---|---|---|
| 5,453,977 | A | 9/1995 | Flammer, III et al. |
| 5,465,251 | A | 11/1995 | Judd et al. |
| 5,537,415 | A | 7/1996 | Miller |
| 6,041,049 | A | 3/2000 | Brady |
| 6,178,172 | B1 | 1/2001 | Rochberger |
| 6,574,662 | B2 | 6/2003 | Sugiyama et al. |
| 6,591,299 | B2 | 7/2003 | Riddle et al. |
| 6,611,522 | B1 | 8/2003 | Zheng et al. |

(Continued)

FOREIGN PATENT DOCUMENTS

| | | |
|---|---|---|
| EP | 1657862 | 8/2007 |
| EP | 1503606 | 3/2008 |

(Continued)

OTHER PUBLICATIONS

"QoS on Cisco Multiservice Switches", CISCO, http://www.cisco.com/en/US/products/hw/switches/ps1925/products_white_paper09186a00800887ae.shtml., 1992.

(Continued)

*Primary Examiner* — Faruk Hamza
*Assistant Examiner* — Diane Lo
(74) *Attorney, Agent, or Firm* — John L. Rogitz

(57) ABSTRACT

An embodiment is a technique to use a single radio for multi-channel wireless communication. A local device having a local channel table operates on a common channel in a multi-channel wireless network having a plurality of network devices to perform management, control, and discovery functions using a single radio. A data session channel is negotiated with a remote device having a remote channel table upon an initiation of a communication session using the local and remote channel tables on the common channel. Data packets are exchanged with the remote device using the data session channel in a data transmission mode.

26 Claims, 10 Drawing Sheets

(56) References Cited

U.S. PATENT DOCUMENTS

| | | | |
|---|---|---|---|
| 6,640,248 B1 | 10/2003 | Jorgensen | |
| 6,674,760 B1 | 1/2004 | Walrand et al. | |
| 6,728,208 B1 | 4/2004 | Puuskari | |
| 7,027,394 B2 | 4/2006 | Gupta et al. | |
| 7,027,411 B1 | 4/2006 | Pulsipher et al. | |
| 7,027,414 B2 | 4/2006 | Walsh et al. | |
| 7,061,925 B2 | 6/2006 | Joshi | |
| 7,106,718 B2 | 9/2006 | Oyama et al. | |
| 7,194,463 B2 | 3/2007 | Zhao et al. | |
| 7,218,637 B1 | 5/2007 | Best et al. | |
| 7,333,435 B2 | 2/2008 | Gerkis | |
| 7,359,971 B2 | 4/2008 | Jorgensen | |
| 7,379,447 B2 | 5/2008 | Dunagan et al. | |
| 7,463,639 B1 | 12/2008 | Rekhter | |
| 7,542,459 B2 | 6/2009 | Conner et al. | |
| 7,583,664 B2 | 9/2009 | Ho et al. | |
| 7,613,167 B2 | 11/2009 | Denney et al. | |
| 7,675,882 B2* | 3/2010 | Mighani et al. | 370/328 |
| 7,680,139 B1 | 3/2010 | Jones et al. | |
| 7,720,065 B2 | 5/2010 | Liu et al. | |
| 7,782,835 B2 | 8/2010 | Gossain et al. | |
| 7,817,609 B2* | 10/2010 | Law et al. | 370/338 |
| 7,885,220 B2 | 2/2011 | Kaidar | |
| 7,974,297 B2 | 7/2011 | Jing et al. | |
| 8,194,593 B2 | 6/2012 | Jing et al. | |
| 8,223,786 B2 | 7/2012 | Jing et al. | |
| 2002/0178282 A1 | 11/2002 | Mysore et al. | |
| 2003/0041161 A1 | 2/2003 | Billings et al. | |
| 2003/0179742 A1 | 9/2003 | Ogier et al. | |
| 2004/0064512 A1 | 4/2004 | Arora | |
| 2004/0073694 A1 | 4/2004 | Frank et al. | |
| 2004/0218580 A1* | 11/2004 | Bahl et al. | 370/350 |
| 2005/0055577 A1 | 3/2005 | Wesemann et al. | |
| 2005/0086295 A1 | 4/2005 | Cunningham et al. | |
| 2005/0135243 A1 | 6/2005 | Lee et al. | |
| 2005/0249220 A1 | 11/2005 | Olsen et al. | |
| 2006/0002311 A1 | 1/2006 | Iwanaga et al. | |
| 2006/0013159 A2 | 1/2006 | Gurevich | |
| 2006/0116148 A1* | 6/2006 | Bahl et al. | 455/517 |
| 2006/0215556 A1 | 9/2006 | Wu et al. | |
| 2006/0256737 A1 | 11/2006 | Choi et al. | |
| 2006/0256742 A1 | 11/2006 | Lee et al. | |
| 2006/0262789 A1 | 11/2006 | Peleg et al. | |
| 2006/0268797 A1 | 11/2006 | Cheng et al. | |
| 2006/0277330 A1 | 12/2006 | Diepstraten et al. | |
| 2006/0280152 A1 | 12/2006 | Lee et al. | |
| 2007/0041385 A1 | 2/2007 | Sali et al. | |
| 2007/0047563 A1 | 3/2007 | Shvodian | |
| 2007/0060168 A1* | 3/2007 | Benveniste | 455/450 |
| 2007/0109989 A1 | 5/2007 | Nakagawa et al. | |
| 2007/0116027 A1 | 5/2007 | Ciavaglia et al. | |
| 2007/0147241 A1* | 6/2007 | Wang et al. | 370/230 |
| 2007/0171844 A1 | 7/2007 | Loyd et al. | |
| 2007/0195727 A1 | 8/2007 | Kinder et al. | |
| 2007/0211736 A1 | 9/2007 | Sapek et al. | |
| 2007/0280106 A1 | 12/2007 | Lund | |
| 2008/0013514 A1 | 1/2008 | Lee et al. | |
| 2008/0069059 A1 | 3/2008 | Yagyu et al. | |
| 2008/0069065 A1 | 3/2008 | Wu et al. | |
| 2008/0075010 A1 | 3/2008 | Song | |
| 2008/0192753 A1 | 8/2008 | Li | |
| 2008/0279216 A1 | 11/2008 | Sharif-Ahmadi et al. | |
| 2009/0003232 A1 | 1/2009 | Vaswani et al. | |
| 2009/0010205 A1 | 1/2009 | Pratt et al. | |
| 2009/0022090 A1 | 1/2009 | Ayoub et al. | |
| 2009/0028095 A1 | 1/2009 | Kish | |
| 2009/0028182 A1 | 1/2009 | Brooks et al. | |
| 2009/0109846 A1 | 4/2009 | Sinha | |
| 2009/0122712 A1 | 5/2009 | Sharif-Ahmadi et al. | |
| 2009/0138966 A1 | 5/2009 | Krause et al. | |
| 2009/0141732 A1 | 6/2009 | Woo et al. | |
| 2010/0046395 A1 | 2/2010 | Sivaramakrishna et al. | |
| 2010/0111006 A1* | 5/2010 | Zhai et al. | 370/329 |
| 2010/0232354 A1 | 9/2010 | Patil et al. | |
| 2010/0232370 A1 | 9/2010 | Jing et al. | |
| 2010/0232371 A1 | 9/2010 | Jing et al. | |
| 2010/0232396 A1 | 9/2010 | Jing et al. | |
| 2010/0232400 A1 | 9/2010 | Patil et al. | |
| 2010/0232447 A1 | 9/2010 | Jing et al. | |

FOREIGN PATENT DOCUMENTS

| | | |
|---|---|---|
| WO | WO 0010357 | 2/2000 |
| WO | WO 2008007255 | 1/2008 |
| WO | WO 2008027005 | 3/2008 |

OTHER PUBLICATIONS

"MultiNet: Connecting to Multiple IEEE 802.11 Networks Using a Single Wireless Card", Chandra, Ranveer et al., http://www.cs.ucsd.edu/classes/sp07/cse291-d/presentations/chen.pdf, SP 2007.

"Connecting to Multiple IEEE 802.11 Networks with One WiFi Card", Microsoft, http://research.microsoft.com/netres/projects/virtualwifi, 2002.

"Providing End-to-End Quality of Service in CDMA2000 Networks", Zhao, Haibo et al., Mobile Technology, Applications and Systems, 2005 Second International Conference on, pp. 1-4, Nov. 15-17, 2005.

"Comparing the bandwidth and priority commands of a QoS service policy", CISCO, http://www.cisco.com/en/US/tech/tk543/tk757/technologies_tech_note09186a0080103 eae.shtml, 2004.

"802.11 TGs MAC Enhancement Proposal", *Samsung, IEEE 802.11-05/589r0*, https://mentor.ieee.org/802.11/file/05/11-05-0589-00-000s-802-11-tgs-mac-enhancement-proposal-doc.doc, (Jun. 15, 2005), 1-10.

Aryafar, Ehsan, et al., "Distance-1 Constrained Channel Assignment in Single Radio Wireless Mesh Networks", http://ieeexplore.ieee.org/Xplore/login.jsp?url=/iel5/4509594/4509595/04509722.pdf?a.rnumber=4509722, (Apr. 13-18, 2008), 762-770.

Office Action dated Aug. 28, 2013 for U.S. Appl. No. 12/402,433.

Office Action for U.S. Appl. No. 12/402,439 dated Sep. 30, 2001.

* cited by examiner

MULTI-CHANNEL SINGLE RADIO COMMUNICATION IN HOME MESH NETWORK

TECHNICAL FIELD

The presently disclosed embodiments are directed to the field of wireless communication, and more specifically, to mesh network.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. As of today, most installed wireless networks are configured and operate in infrastructure mode where one or more access points (APs) are configured as interfaces for a wired distribution network (e.g., Ethernet). In centralized AP network, every device is connected to the AP and can only use one channel for communication. This limits channel usage efficiency. Multi-channel network allows using different channels for different communication links. The main advantages of using different channels for each link include efficient usage of network spectrum and the greatly improved total network capacity. However, one disadvantage of conventional multi-channel network is the use of multi-radio devices to establish connections to the corresponding multiple channels.

SUMMARY

One disclosed feature of the embodiments is a method and apparatus to use a single radio for multi-channel wireless communication. A local device having a local channel table operates on a common channel in a multi-channel wireless network having a plurality of network devices to perform management, control, and discovery functions using a single radio. A data session channel is negotiated with a remote device having a remote channel table upon an initiation of a communication session using the local and remote channel tables. Data packets are exchanged with the remote device using the data session channel in a data transmission mode.

BRIEF DESCRIPTION OF THE DRAWINGS

Embodiments may best be understood by referring to the following description and accompanying drawings that are used to illustrate embodiments. In the drawings.

DETAILED DESCRIPTION

One disclosed feature of the embodiments is a technique to use a single radio for multi-channel wireless communication. A local device having a local channel table operates on a common channel in a multi-channel wireless network having a plurality of network devices to perform management, control, and discovery functions using a single radio. A data session channel is negotiated with a remote device having a remote channel table upon an initiation of a communication session using the local and remote channel tables. Data packets are exchanged with the remote device using the data session channel in a data transmission mode In the following description, numerous specific details are set forth. However, it is understood that embodiments of the invention may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. The beginning of a flowchart may be indicated by a START label. The end of a flowchart may be indicated by an END label. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
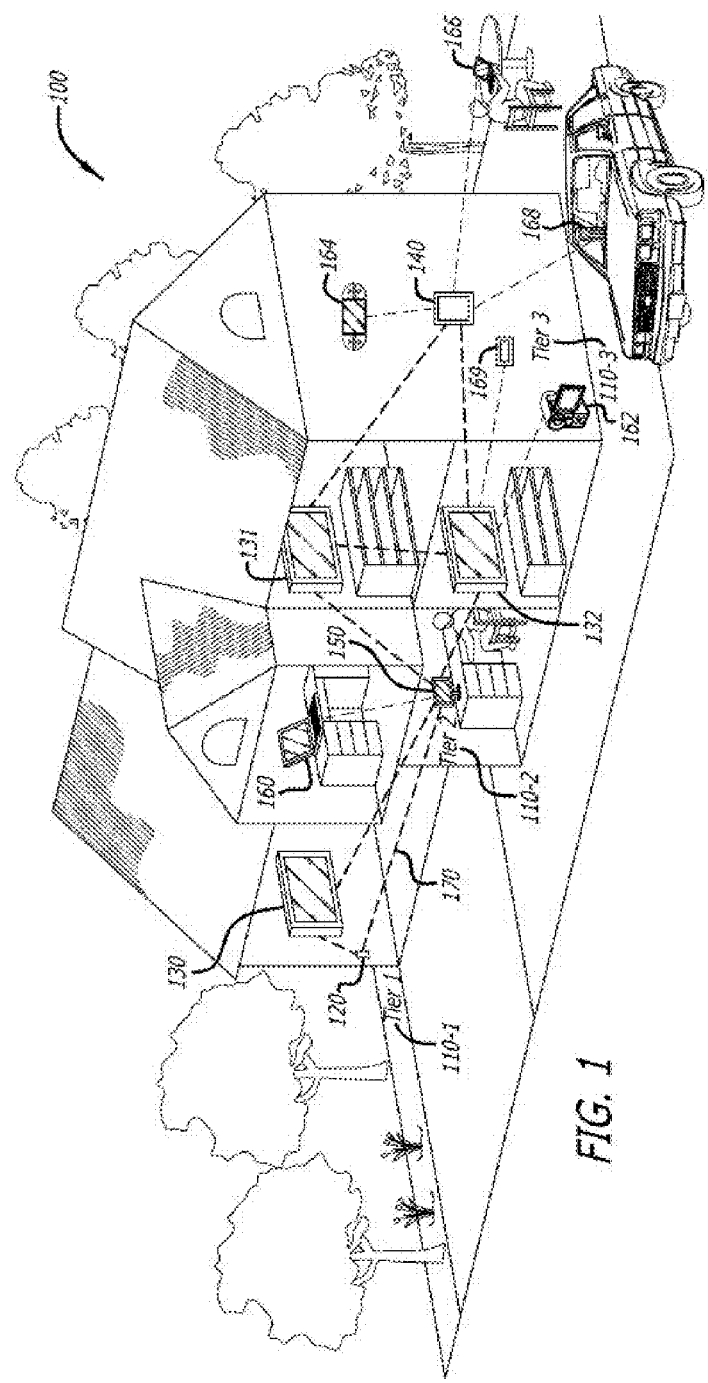
FIG. 1 is a diagram illustrating a system of a three-tier wireless ad hoc home mesh network (WHMN) according to one embodiment.

FIG. 1 is a diagram illustrating a system of a three-tier wireless ad hoc home mesh network (WHMN) according to one embodiment.

Multi-tier wireless home mesh network 100 (hereinafter referred to as "WHM network" or "WHMN" 100) comprises a collection of nodes that operate as a decentralized, wireless home mesh network with multiple (N≥1) sub-networks $101_1$-$110_N$ (hereinafter singularly referred to as "tiers") that are responsible for different functions within WHM network 100. Hence, mostly every node of WHM network 100 is configured to forward data to other nodes and is assigned to a specific tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of WHM network 100 features a hierarchical architecture comprising three (3) tiers that are assigned based on the capabilities of the node. A first tier ("tier 1") 110$_1$ is responsible for establishing and controlling access to an external network such as the Internet. For example, first tier 110$_1$ may resemble a traditional Internet connection via a cable or direct subscriber line (DSL) connection or 3G/WiMax/Outdoor mesh. As illustrated, first tier 110$_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WHM network 100 in order to provide multiple communication paths to external network(s).

A second tier ("tier 2") 110$_2$ of WHM network 100 may represent a wireless network backhaul that interconnects various stationary (fixed-location) wireless nodes such as stationary (fixed-location) electronics devices adapted for communicating over a wireless communication medium such as, for example, radio frequency (RF) waves. As described herein, an "electronic device" may be stationary or mobile. A "stationary electronics device" includes, but is not limited or restricted to: a flat-panel television (130, 131, and 132), a gaming console (140), desktop computer (150), or any other device that is usually stationary and is electrically coupled to an AC power outlet. Hence, stationary electronics devices are not subject to power constraints that are usually present in mobile nodes where power usage is minimized to extend battery life between recharges.

A third tier ("tier 3") 110$_3$ of WHM network 100 may include links between a wireless node belonging to second tier 110$_2$ and one or more mobile nodes (160, 162, 164, 166, 168 & 169). A "mobile node" may include any battery powered electronics device with wireless connectivity including, but is not limited to a laptop computer, handheld device (e.g., personal digital assistant, ultra mobile device, cellular phone, portable media player, wireless camera, remote control, etc.) or any non-stationary consumer electronics devices. Since mobile nodes normally have resource constraints (e.g., limited power supplies, limited processing speeds, limited memory, etc.), third tier 110$_3$ may provide reduced network services. In one embodiment, mobile nodes of WHM network 100 may act as a slave or child connecting directly to a tier-2 node, which may further limit their functionality within WHM network 100.

Table 1 summarizes a multi-tier, wireless home mesh network architecture, categorization by potential network characteristics, tier node descriptions and traffic type that is prevalent over WHM network 100.

TABLE 1 multi-tier wireless home mesh network scenario

|  |  | Characteristics | Examples |
|---|---|---|---|
| Network | Dimension | ~50 × 60 sq ft; 1-2 stories or high-rising building | House Apartment building Business |

TABLE 1-continued multi-tier wireless home mesh network scenario

|  |  | Characteristics | Examples |
|---|---|---|---|
|  | Node Number | Tier 2 - 3~10; Tier 3 - 5~20 | 2 TVs, 1 desktop computer, 1 PS3; 2 laptops, 4 mobile phones, 4 media players, . . . |
|  | Distribution | Indoor, 3D, Non-LOS, link distance 15~60 ft | Uniformly distributed Tier-2 nodes, clustered Tier 3 |
| Node Type (per Tier Network) | Tier 1 | Usually one or two Tier 1 nodes | Cable/DSL modem, WiMax/3G, Outdoor Mesh |
|  | Tier 2 | Fixed location, power-sufficient (TX power 100 mW-1 W) | TV, desktop computer, gaming console (e.g. PS3), etc. |
|  | Tier 3 | Mobile, power-limited (TX power 1-100 mW) | Laptop, mobile phone, portable media player, wireless camera, remote |
| Traffic | HD video streaming | ~30 Mbps compressed | 1080 p/i, 720 p/i, 480 p/i quality HD videos |
|  | SD Video/ Audio streaming | ~100k-1 Mbps video, 32k-256 kbps audio | Internet video clip (e.g. YouTube ®), webcam output, mp3 audio, voice |
|  | Data | Bursty transmission, ~20 Mbps for certain user satisfaction | http type data (web browsing) |

As indicated by Table 1, WHM network 100 is distinct from conventional mesh-network solutions because WHM network 100 is directed to consumer electronics (CE) devices and video-centric applications. Based on the traffic indicated in Table 1, which may include high-definition (HD) video, audio clips and video clips, as well as user data, wireless NICs may be incorporated within some of the stationary nodes of the WHM network 100. For example, by multiplexing one flow of compressed HD video, four Internet video sessions plus four audio/video sessions and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier 2 nodes might require an 802.11n type radio (e.g., at 5 GHz band) to meet such a bandwidth requirement.

Figure 2:
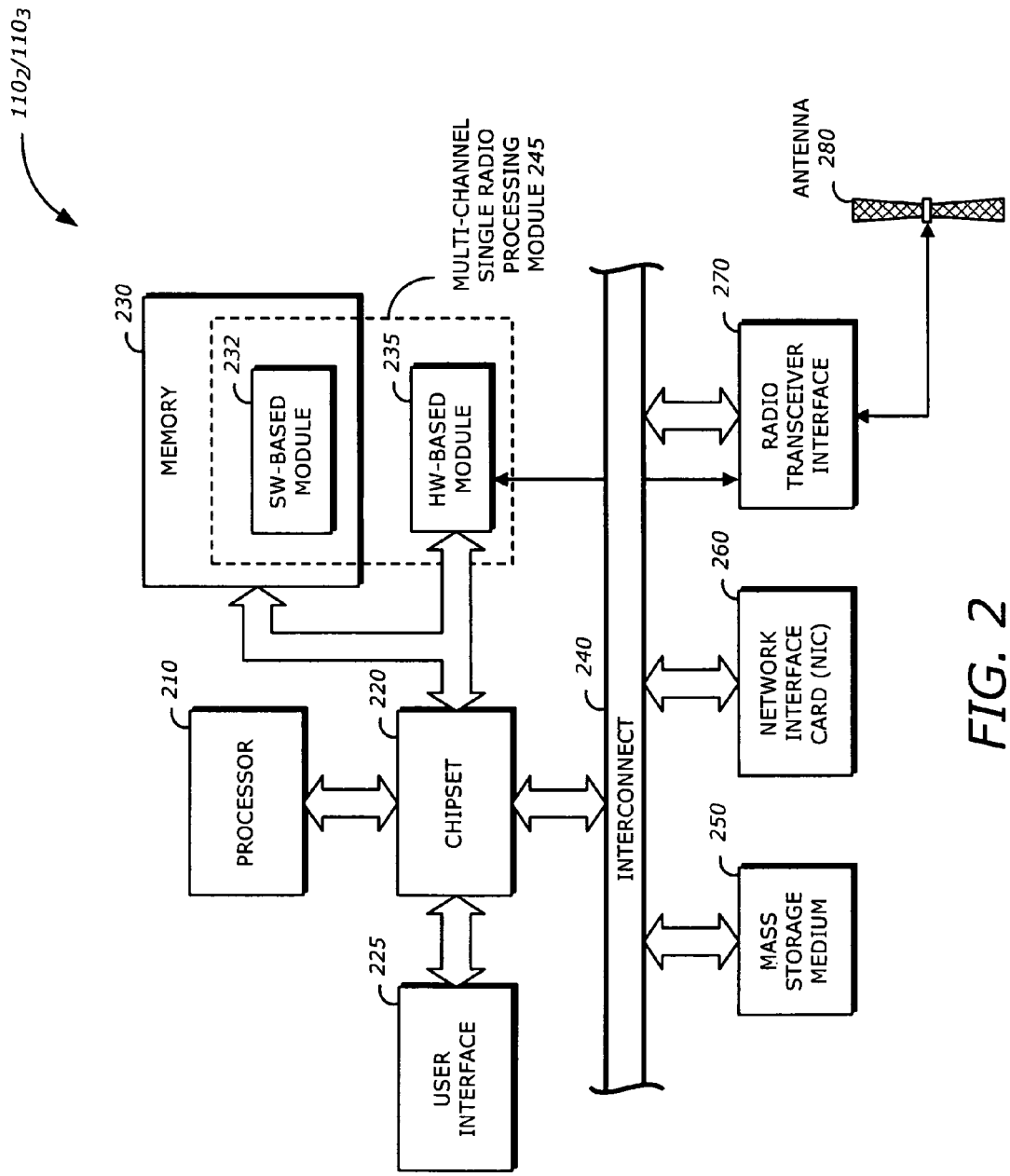
FIG. 2 is a diagram illustrating a single radio device within a WHMN according to one embodiment.

FIG. 2 is a diagram illustrating the single radio device 110$_2$/110$_3$ within a WHMN according to one embodiment. The single radio device 110$_2$/110$_3$ may be a tier-2 or tier-3 device in the WHMN. It may be part of a mobile or stationary device. It may include a processor 210, a chipset 220, a user interface 225, a memory 230, an interconnect 240, a multi-channel single radio processing module 245, a mass storage medium 250, a network interface card (NIC) 260, a radio transceiver interface 270, and an antenna 280.

The processor 210 may be a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 220 provides control and configuration of memory and input/output (I/O) devices such as the user interface 225, the memory 240, the mass storage medium 250, the NIC 260, and the radio transceiver interface 270. The chipset 220 may integrate multiple functionalities such as I/O controls, graphics, media, host-to-peripheral bus interface, memory control, power management, etc. The chipset 220 may also interface to the mass storage devices in the mass storage medium 250, the multi-channel single radio processing module 245, and other devices in the system.

The multi-channel single radio processing module 245 may include a software (SW)-based module 232 and a hardware (HW)-based module 235. It is noted that the multi-channel single radio processing module 245 may include more or less than the above components. For example, it may include only the SW-based module 232 or only the HW-based module 235. The multi-channel single radio processing module 245 performs communication using a single radio through the use of multiple channels. The SW-based module 232 may include programs, instructions, or functions to carry out part or all of the operations for the multi-channel single radio processing. The HW-based module 235 may include circuits, logic, devices, or firmware components to carry out part or all of the operations for the multi-channel single radio processing. The multi-channel protocol replies on fast channel switching performed by physical radio transceiver 270, where the HW-based module 235 may control the way to switch radio parameters for the radio transceiver 270.

The memory 240 stores system code and data. The memory 240 is typically implemented with dynamic random access memory (DRAM), static random access memory (SRAM), or any other types of memories including those that do not need to be refreshed, including read only memory (ROM), flash memories. In one embodiment, the memory 240 may contain the SW-based module 232 that performs the functions of communication using a single radio. The user interface 225 may include circuits and functionalities that provides interface to a user. This may include display control, entry device control, remote control, etc. The entry device or devices may include keyboard, mouse, trackball, pointing device, stylus, or any other appropriate entry device. The display device may be a television (TV) set, a display monitor, or a graphic output device. The display type may include any display type such as high definition TV (HDTV), cathode ray tube (CRT), flat panel display, plasma, liquid crystal display (LCD), etc.

The interconnect 240 provides an interface for the chipset 220 to communicate with peripheral devices such as the mass storage medium 250 and the NIC 260. The interconnect 240 may be point-to-point or connected to multiple devices. For clarity, not all the interconnects are shown. It is contemplated that the interconnect 240 may include any interconnect or bus such as Peripheral Component Interconnect (PCI), PCI Express, Universal Serial Bus (USB), and Direct Media Interface (DMI), etc.

The mass storage medium 250 may store archive information such as code, programs, files, data, and applications. The mass storage interface may include small system computer interface (SCSI), serial SCSI, Advanced Technology Attachment (ATA) (parallel and/or serial), Integrated Drive Electronics (IDE), enhanced IDE, ATA Packet Interface (ATAPI), etc. The mass storage medium 250 may include compact disk (CD) read-only memory (ROM), memory stick, memory card, smart card, digital video/versatile disc (DVD), floppy drive, hard drive, tape drive, and any other electronic, magnetic or optic storage devices. The mass storage device or medium 250 provides a mechanism to read machine-accessible media. The NIC 260 provides interface to the various network layers in the WHMN such as the TCP/IP layer and the MAC layer.

The radio transceiver interface 270 may include analog and digital circuits to perform radio communication interface. It is connected to the antenna 280 to receive and transmit radio frequency (RF) signals. It may include analog and digital circuitries for fast down-conversion, filtering, analog-to-digital conversion, digital-to-analog conversion, up-conversion, wireless LAN interface, frequency multiplexing, etc. In one embodiment, the radio transceiver interface 270 includes circuits to perform multi-channel single radio communication within the frequency ranges provided by the IEEE 802.11x standards (e.g., from 2.4 GHz to 5 GHz). This may include frequency switching or multiplexing circuit to change the frequencies while switching from one channel to the next channel within the frequency range. The frequency switching function is usually implemented with advanced hardware to minimize the delays in tuning the radio operating parameters. The radio circuit may also include capabilities to listen on a certain frequency and gather interference or noise power level within a particular bandwidth. For example, three non-overlapping 22 Mhz channels are allocated for 802.11 radios at 2.4 GHz band in United States.

Figure 3A:
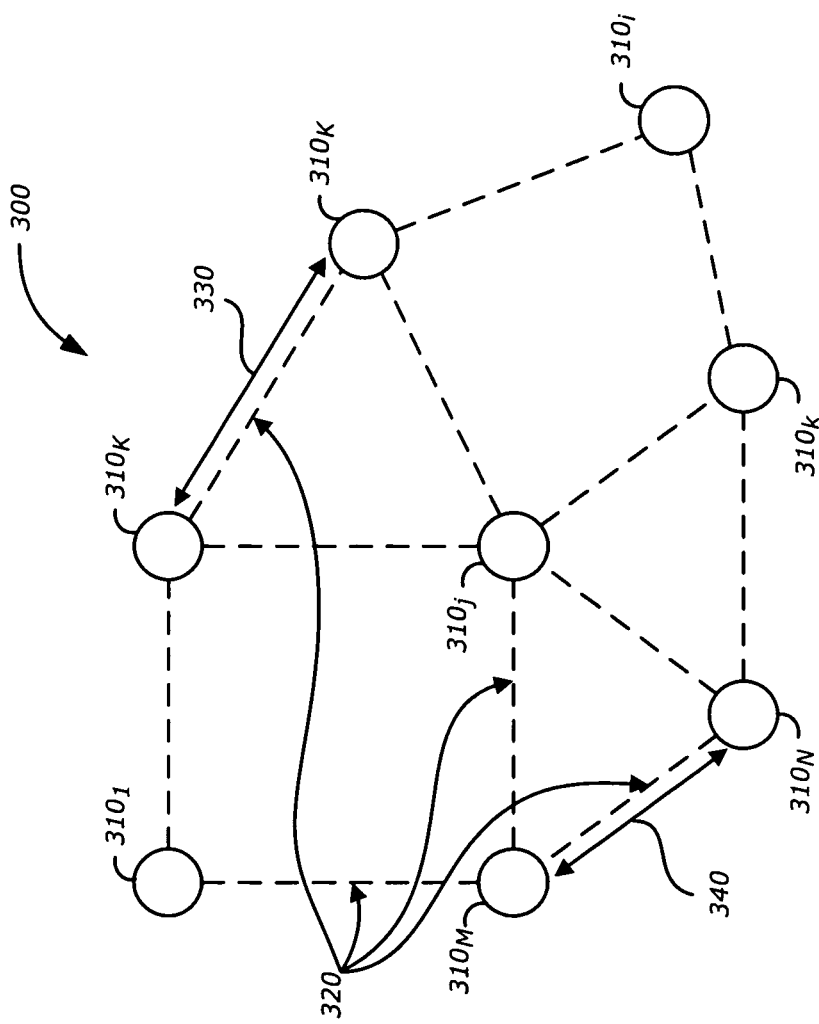
FIG. 3A is a diagram illustrating a network of multiple nodes in a multi-channel WHMN according to one embodiment.

The antenna 280 may be any appropriate RF antenna for wireless communication. In one embodiment, the antenna 280 is the single antenna used for single radio operation. It is the only antenna attached to the device $110_2/110_3$. It may be designed to accommodate the frequency ranges as provided by the IEEE 802.11x standards. The frequency range may be tuned to operate in different channels at 2.4 GHz and 5 GHz. The channel allocation may be defined by the IEEE 802.11x standard, FIG. 3A is a diagram illustrating a network 300 of multiple nodes in a multi-channel WHMN according to one embodiment. The network 300 includes a number of nodes $310_1, \ldots, 310_i, 310_j, 310_k, 310_K, 310_L, 310_M, 310_N$. The network 300 forms a wireless mesh network that operates in a multi-channel single radio communication. It may include mesh and non-mesh devices. A non-mesh device is a device that may not have the capability to understand the mesh-formatted messages. A non-mesh device, however, may participate in the network 300 by interpreting non-mesh messages contained in non-mesh frames. However, a non-mesh device may not be able to participate in channel negotiations and other multi-channel activities.

The nodes $310_j$'s may represent any devices that are part of the multi-channel WHMN. They may represent the device $110_2/110_3$ shown in FIG. 2. They communicate with each other using multi-channel single radio protocols as described in the following. The multi-channel single radio protocols allow simultaneous traffic flows in different part of the network using orthogonal, or non-overlapping, wireless channels to improve the total network throughput. They may maintain connectivity with multiple channels. In one embodiment, all of the devices or nodes $310_j$'s use a common or control channel 320 shown with dashed or dotted lines in FIG. 3 when operating in the common or control mode. The common or control channel may be fixed and decided in advance, or may be dynamically negotiated between devices when they start the network. Alternatively, the common or control channel may not be a dedicated channel. For example, the nodes may negotiate among themselves to select a channel to act as the common or control channel. Furthermore, the selection of the common or control channel may be static or dynamic. The selection may be dynamically reconfigured according to network parameters such as traffic, load, powers, interferences, etc.

The common or control mode is the mode in which all participating devices or nodes $310_j$'s exchange management, channel table routing, and special messages. A structured super frame may be sent to contain management and control messages. The common or control mode allows devices that wish to communicate with each other to negotiate on a particular channel for data session communication. Once this negotiation is successful, the devices may then switch to a data session channel that is agreed upon between them in a session mode. For example, nodes $310_K$ and $310_L$ uses a data session channel 330, nodes $310_M$ and $310_N$ uses a data session channel 340. During the common or control mode, the nodes are aware of the usage status of all the available channels. From this information, they negotiate to carry data sessions only on the channels that are not currently used. Therefore, the data session channels, if used simultaneously or in overlapping time periods, are selected to be separate. The channel negotiation may minimize or reduce interference among the data session channels by selecting orthogonal channels for different communication sessions. By switching to negotiated data session channels, the nodes or network devices are able to utilize the available bandwidth of the data session channels. In addition, since the selected data session channels are orthogonal to, or non-overlapping with, each other and/or the common or control channel, the data transmissions on the data session channels have very little or minimum interferences.

Figure 3B:
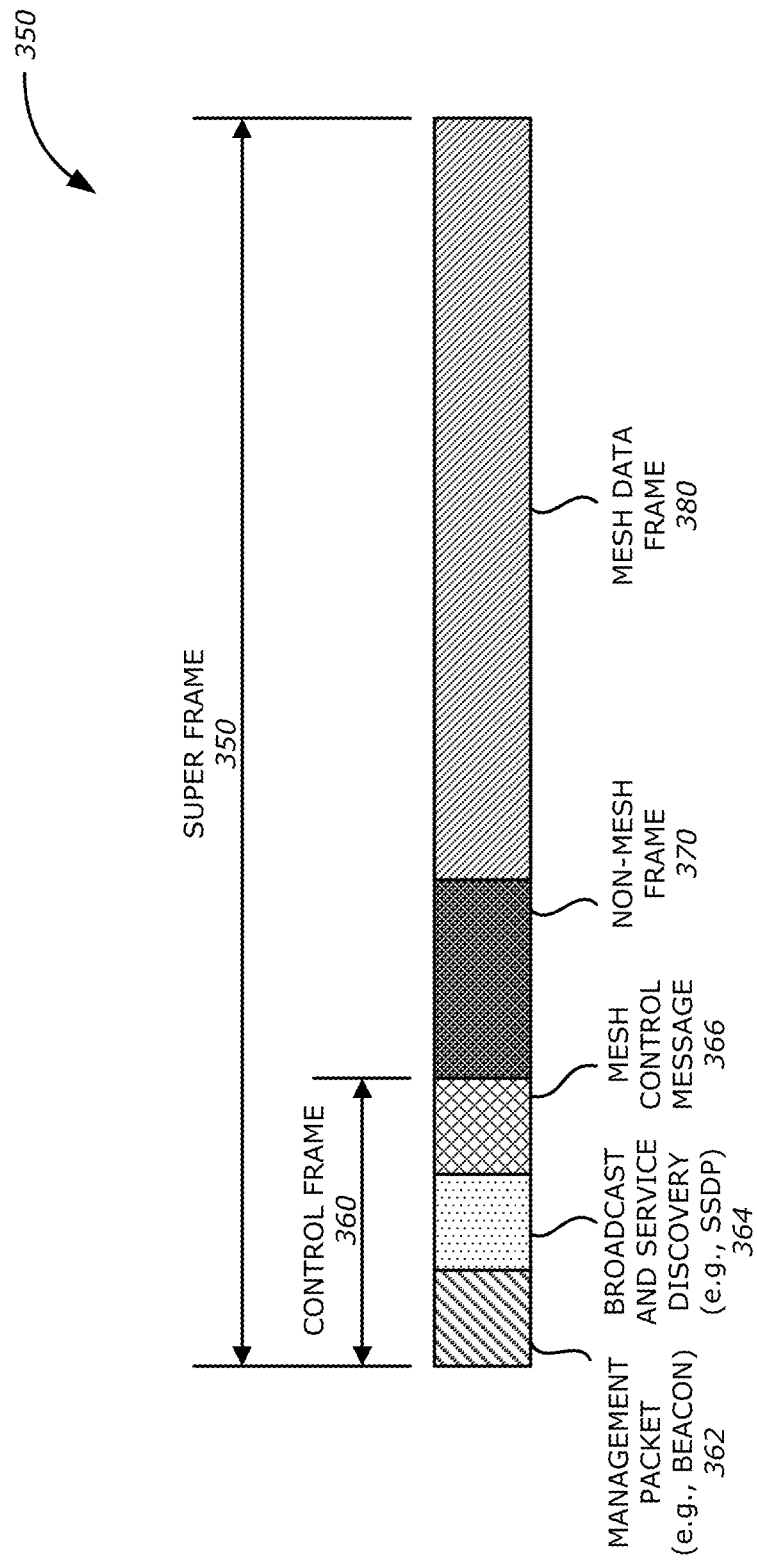
FIG. 3B is a diagram illustrating a super frame structure according to one embodiment.

FIG. 3B is a diagram illustrating a super frame structure 350 according to one embodiment. The super frame structure 350 may include three frames or fields: a control frame 360, a non-mesh frame 370, and a mesh data frame 380. The super frame structure 350 may include more or less than the above frames or fields. The super frame structure 350 may be transmitted according to the underlying protocol standard (e.g., an 802.11 standard). In general, the super frame structure 350 may be described as the divided channel time for control and data information. All messages and information are carried in the super frame where the control information may be located at the beginning and followed by the data. The super frame structure 350 may not be a packet. It may be a concept or structure to depict how to multiplex the control and data in the airtime. For example, each node knows the beginning of a super frame and may exchange control information with other nodes at the beginning and exchange data afterwards.

The control frame 360 includes beacon, synchronization, timing, discovery, and other control messages. It may include a management packet 362, a broadcast and discovery message 364, and a mesh control message 366. The management packet 362 may contain beacon information. It may conform to an 802.11 standard. The broadcast and discovery message 364 may include any messages used for discovery, authentication, or association such as Simple Service Discovery Protocol (SSDP). The mesh control message 366 may include any messages used for control and management functions for the mesh network The non-mesh frame 370 may include data or messages pertaining to non-mesh devices in the network. The mesh data frame 380 may include data or messages pertaining to mesh devices in the network. In one embodiment, the mode change (from ad-hoc mode to managed mode) to accommodate non-mesh device may be implemented by interface virtualization.

Figure 4:
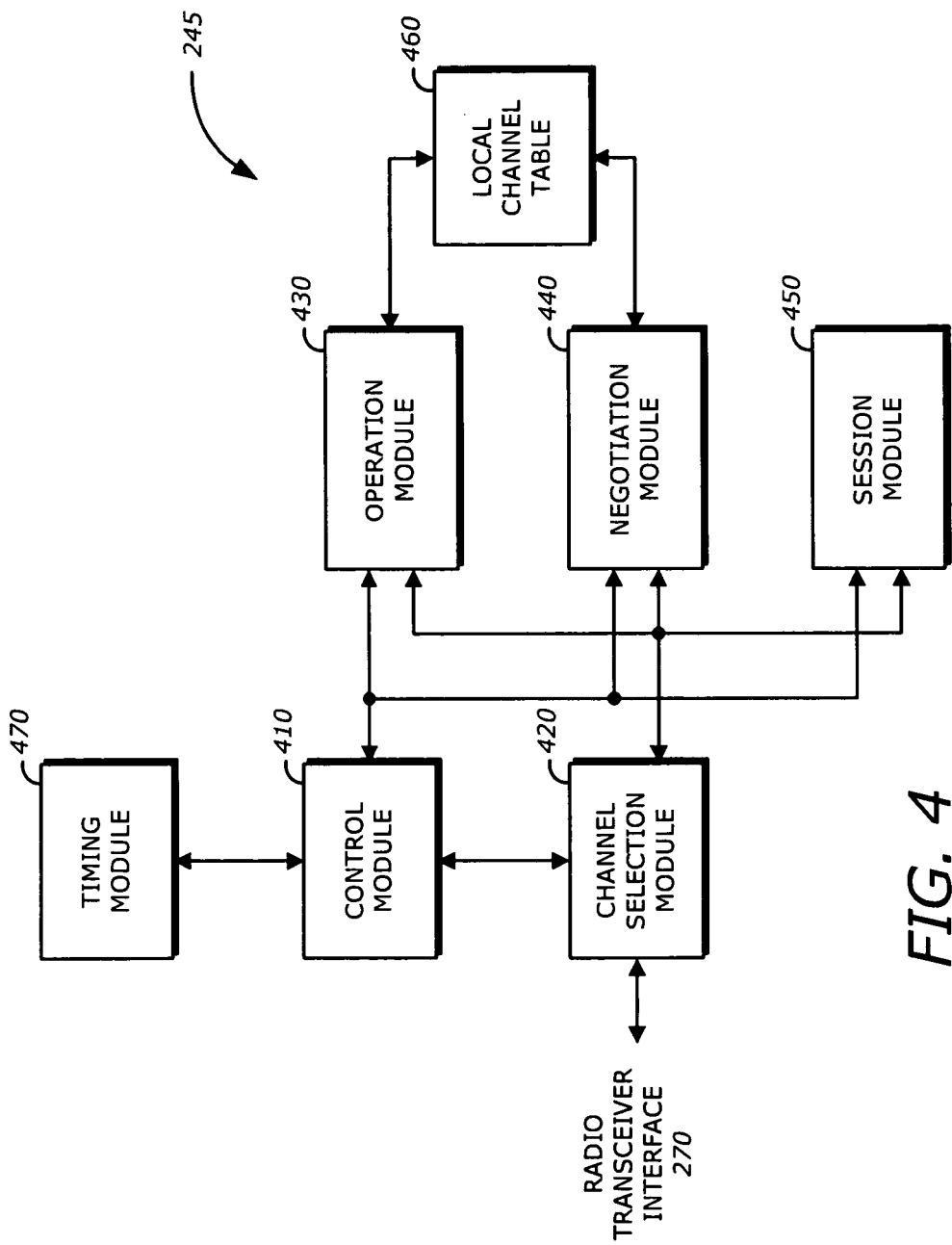
FIG. 4 is a diagram illustrating a multi-channel single radio processor according to one embodiment.

FIG. 4 is a diagram illustrating a multi-channel single radio processor or processing module 245 shown in FIG. 2 according to one embodiment. The multi-channel single radio processor or processing module 245 may include a control module 410, a channel selection module 420, an operation module 430, a negotiation module 440, a session module 450, a local channel table 460, and a timing module 470. For ease of reference, the underlying device containing the multi-channel single radio processor 245 is referred to as a local device while the other devices in the network are referred to as remote devices.

The control module 410 performs control functions such as user interactions, module selection. It may interpret messages sent by other devices to determine if a remote device wishes to initiate a communication session with the local device as a receiver. It may generate a message to initiate a communication session to a remote device if the local device is a sender. It may select any one of the operation module 430, the negotiation module 440, and the session module 450 according to the received messages. It may also interact with the channel selection module 420 to determine if a data session channel has been selected or to select a data session channel. It may interact with the timing module 470 to obtain timing information needed for synchronizing various activities. It may also set a timer to take into account the network delay in exchanging control messages. For example, if the system takes $\Delta t$ seconds to exchange the control information among the nodes, the update time may be set to ($\Delta t+q$) where q is a properly selected delay. At the end of the $\Delta t$ interval, all nodes will know the status of the direct neighbor nodes and the availability of the channels. Based on this information, the new channel assignment may be performed so that it is followed at the beginning of ($\Delta t+q$) seconds. In other words, a node essentially negotiates for its future communication sessions.

The channel selection module 420 interfaces to the radio transceiver interface 270 (FIG. 2) to perform channel selection based on result of the negotiation performs by the negotiation module 440. It may include functionalities to switch between channels depending on the timings as scheduled by the control module 410 or the timing module 470.

The operation module 430 includes functionalities to allow the local device to operate on a common or control channel to perform management, control, and discovery functions using a single radio. In one embodiment, it may perform a packet queue management operation, send a routing message, exchange special messages having information on traffic flow and channel selection with network devices, and form the local channel table 460 containing information on active channels in the multi-channel wireless mesh network. The management operation may be any one of beaconing, association, and authentication operations. In one embodiment, these operations conform to the operations as specified in the IEEE 802.11x standards. For example, they may listen to the beacon message to maintain a tight timing synchronization. The operation module 430 forms the local channel table 460 by gathering the information on the active channels from the special messages and sorting the active channels in terms of an availability criterion using the gathered information.

The negotiation module 440 negotiates a data session channel with a remote device of the plurality of network devices upon an initiation of a communication session. The communication session may be initiated by a remote device or by the local device. The communication session may be initiated by a transmitter that wishes to send a stream of data or content to a receiver. The communication session may also be initiated by a receiver that wishes to receive data or content from a transmitter. The transmitter or the receiver may be the local device or the remote device. The remote device may have its own local channel table, which is presented as a remote channel table. The remote channel table is similar to the local channel table except that it is from the point of view of the remote device. In one embodiment, the data session channel may be the same or different than the common channel. It is typically orthogonal to, or non-overlapping with, the common channel. When the common channel is not in use by any other session in the local region, the current session may choose to use it. The common channel is usually reserved for control purpose because control information may be exchanged at any time. In one embodiment, very high priority traffic may use the control channel for data transmission. It is desired to keep the number of channel switchings as low as possible to reduce delays. The negotiation module 440 may perform a number of tasks during the negotiation. It may send the local channel table 460 to the remote device, receive the remote channel table from the remote device, propose a most available channel common to the local data channel and the remote channel table, confirm the most available channel being the data session channel, and announce use of the data session channel.

The session module 450 performs data exchanging functions with the remote device using the data session channel in a data transmission mode. It may switch the single radio to the data session channel by sending a request to the channel selection module 420. It may receive the data from the remote device if the local device is a receiver. It may transmit the data to the remote device if the local device is a transmitter. It may periodically return to the common channel to monitor network activity while in the data transmission mode.

The local channel table 460 represents the activities or the availability of the active channels as seen or assessed by the local device. The local channel table 460 may be implemented by any suitable data structures such as a table, a linked list, a queue, etc. It contains the channel names or identifiers that are arranged or sorted according to a pre-determined availability criterion or criteria common to all devices in the network. The availability criteria may include any suitable criteria that indicate the degree of availability or vacancy of the associated channel for a communication session. In one embodiment, the availability criteria may include available bandwidth, traffic, receive and transmit power, distance, and interference power. In one embodiment, the most available, or most vacant, channel is a channel that has the least amount of on-going traffic and the least interference power.

The timing module 470 may provide timing information to the control module 410 for various timing activities such as channel switching. In one embodiment, the channel switching operates on a time division multiple access (TDMA) mode. The timings of the channel switching between the common channel and the data session channel may be determined in advance. The timing module 470 may generate interrupt signals to the control module 410 to signal a channel switching. It may also generate timing interrupt signals to various modules in the multi-channel single radio processing module 245 to synchronize their operations. The timing module 470 helps synchronize time across multiple modules. Having accurate time across various functional units may be necessary for the successful operation of the system. For example, every functional unit should be aware of when the data transmission slot is starting, in this way, the radios have switched to the appropriate channel (and/or mode), and start dequeuing the appropriate data queue. Any delay or mismatch in such time sensitive operations may result in low throughput. Similarly, it may be useful that activities like sending (or listening) to beacons is carried at the exact interval. Proper functioning of beacons is necessary to avoid network partitioning. In one embodiment, the timing module 470 generates timer interrupt signals to various modules to trigger all transitions. For example, the transitions from the control mode to the data exchange mode and back to the control mode. Within the control mode, the timer interrupts may help determine finer sub-frame timings, such as for beacon, routing, mesh control, etc. The same holds true for non-mesh time slots are considered.

The local channel table 460 may be formed by gathering information or message exchanges by the operation module 430. For example, the special messages transmitted by the nodes $310_j$'s shown in FIG. 3 may include the identifiers of the active links or channels in the network. From these messages, each node or device may construct or form its local channel table that reflects its assessment of channel availability or vacancy of all the channels in the neighbor network. When two nodes begin the channel negotiation, they exchange their channel tables. From its local channel table and the remote table, a node may be able to identify a channel that is most available, or most vacant, and that is common to both tables. A node does not finish negotiations with the remote node until it has received all the remote channel tables from all of its active neighbors. In this way, it makes channel selection decision based on accurate information. This node may then negotiate with the remote node regarding using this channel as the data session channel. If the remote node agrees, the two may confirm the selection and then begin using the selected data session channel for data exchange at the beginning of ($\Delta t+q$) seconds. Any disagreement may then eventually be resolved when new vacant channels are available, or a sub-optimal channel (with less interference) is available, so that the two nodes will agree on a data session channel. Typically, a node acting as a receiver may have the priority to make the decision regarding the channel selection because radio interference typically matters most at the receiver. When serious conflicts occur at both nodes, a sub-optimal channel may be selected. For the nodes which handle multi-hop traffic, the previous hop and next hop link may negotiate to use different channels. This node may need to switch between the two channels for forwarding data hop by hop and may need to notify the previous hop and next hop nodes when it is ready to receive or transmit using the control channel.

The following example serves to illustrate the negotiation protocol. Suppose nodes A and B wish to communicate with each other. When they start the negotiation, each node has already gathered enough information to create its local channel table. The channel table contains a sorted list of active channels. For example, the local channel table of each node is as shown in Table 2.

TABLE 2

| Local channel tables for nodes A and B | |
|---|---|
| A | B |
| x | p |
| y | m |
| t | x |
| m | t |
| p | z |
| z | y |

Suppose A is the transmitter and B is the receiver. From B's point of view, channel p is the most desirable because it is most available or most vacant. B may then propose p as the data session channel. A may decide to accept p or reject p. If A accepts p, A sends an acknowledgement to confirm. B may send a confirmation message and the negotiation is terminated. If A decides not to accept p, A may propose m. The negotiation may continue until both agree on the same channel.

To facilitate the selection process, the local channel table may include a figure of merit (FoM) for each candidate channel. The figure of merit may reflect a quantitative measure of the availability or the vacancy. After exchanging the local channel tables, each node may be able to determine the channel that has the best figure of merit overall. As an illustrative example, Table 3 shows the channel table with the figures of merit as assessed by nodes A and B.

TABLE 3

Local channel tables for nodes A and B

| A | B |
|---|---|
| x = 9 | p = 12 |
| y = 7 | m = 9 |
| t = 6 | x = 8 |
| m = 4 | t = 6 |
| p = 2 | z = 3 |
| z = 1 | y = 2 |

When each node adds the figures of merit (FoM), they have the following result shown in Table 4.

TABLE 4

Local channel tables for nodes A and B
Total FoM

| |
|---|
| x = 17 |
| y = 9 |
| t = 12 |
| m = 13 |
| p = 14 |
| z = 4 |

Since x has the highest FoM, both nodes agree on using x as the data session channel. In this example, x is the channel that is the most available, or most vacant, channel common to both tables or as seen by both nodes or devices.

The same concept may be extended for more than two nodes. For example, nodes A, B, and C wish to exchange data. Suppose node A negotiates channel with one node at a time. Table 5 shows the channel tables as constructed by nodes A, B, and C.

TABLE 5

Local channel tables for nodes A, B, and C

| A | B | C |
|---|---|---|
| x | p | z |
| y | m | x |
| t | x | m |
| m | t | t |
| p | z | p |
| z | y | y |

In the above example, B negotiates with C on using channel m and negotiates with A to use channel x. B, therefore, has two data transmission modes, one operating on channel m with C and one operating on channel x with A.

The local channel table may also contain an entry that is marked in use for channel that has been occupied. During negotiation, a channel marked in used will be ignored. Table 6 is an example that illustrates this. The plus (+) mark indicates that the channel is in use.

TABLE 6

Local channel tables for nodes A, B and C with in-use marks

| A | B | C |
|---|---|---|
| +x | p | +z |
| y | m | x |
| t | x | m |
| m | +t | t |
| p | z | p |
| z | y | y |

In this example, channels x and t are ignored in the negotiation between nodes A and B, channels z and t are ignored in the negotiation between nodes B and C. Nodes A and B may negotiate on using channel m. Nodes B and C may negotiate on using channel x.

When there is contention regarding the selected channels, additional criteria may be employed to resolve the conflict. As an illustration, the type of data or content to be transmitted may be given a priority ranking. For example, video streaming data may have higher priority than web browsing data. Suppose in the example shown in Table 6, nodes A and B are involved in video streaming data, and nodes B and C are involved in web browsing data. Suppose that nodes A and B agree on channel m and nodes B and C also agree on channel m. In this case, since A and B involves with data that has a higher priority ranking than data involved in B and C, channel m will be selected for nodes A and B. Nodes B and C then will negotiate another channel, say, channel x.

The multi-channel single radio communication may be extended to include non-mesh nodes or devices. To accommodate non-mesh nodes or devices, the super frame may include a non-mesh frame used for communication with non-mesh devices as shown in FIG. 3B. In one embodiment, if infrastructure-less non-mesh is supported, then mode switching may not be needed. However, mode switching may be needed if the non-mesh support involves infrastructure mode. The common or control channel may be extended to have two parts. One is used for the normal management and control messages. One is used for non-mesh data. As a result, non-mesh traffic may be supported in a larger common or control channel slot.

Figure 5:
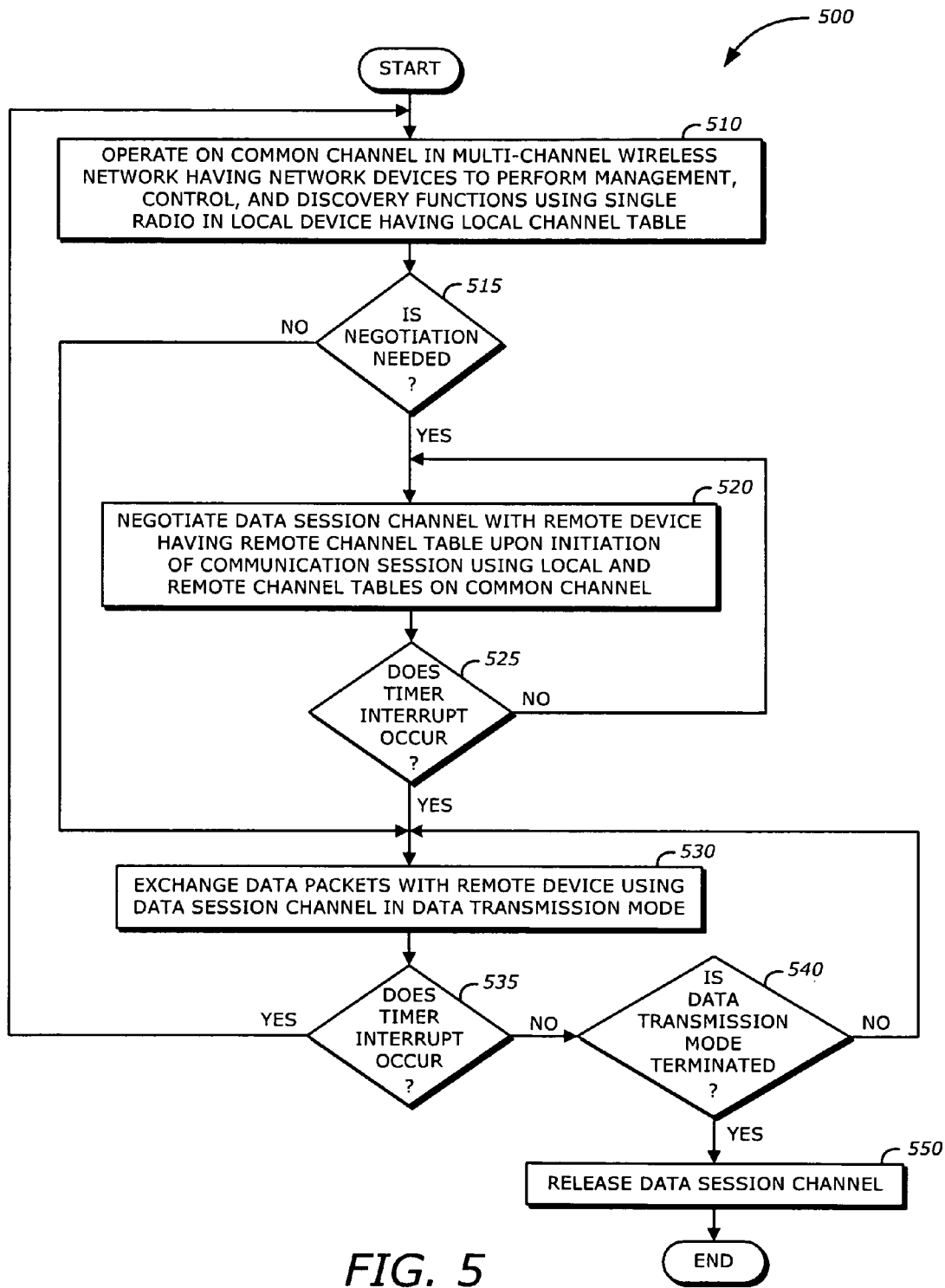
FIG. 5 is a flowchart illustrating a process to perform multi-channel single radio communication according to one embodiment.

FIG. 5 is a flowchart illustrating a process 500 to perform multi-channel single radio communication according to one embodiment. As is known by one skilled in the art, the flowchart only illustrates the logic and sequence of operations and may not completely depict hardware-generated events such as the timer interrupts. For clarity, the details of the timer interrupts may not be all shown for the individual timing events. As discussed above, the timing module 470 in FIG. 4 generate timer interrupts to synchronize all timing events. These timing events may include transitions or switchings from control mode to data exchange mode (or vice versa), mesh control/data to non-mesh control/data, sub-frame timings within control mode, etc.

Upon START, the process 500 operates on a common channel in a multi-channel wireless network having a plurality of network devices to perform management, control, and discovery functions using a single radio in a local device having a local channel table (Block 510). The dedicated common channel may be always used when a node starts operation. A dynamic control channel may be negotiated and used temporarily when all the neighbor nodes agree. Next, the process 500 determines if a channel negotiation is needed (Block 515). It is possible that the channel negotiation for a session has been performed and the nodes are in the process of exchanging data. If a channel negotiation is not needed, the process 500 proceeds to Block 530 based on the timer interrupt indicating start of the mesh data slot. Otherwise, the process 500 negotiates a data session channel with a remote device having a remote channel table upon an initiation of a communication session using the local and remote channel tables on the common channel (Block 520). The data session channel may be the same or different than the common channel. Next, the process 500 determines if a timer interrupt occurs signaling a mode change from negotiation to data exchange (Block 525). If not, the process 500 returns to block 520 to continue negotiation or waits for timer interrupt if the negotiation has been completed. Otherwise, the process 500 exchanges data packets with the remote device using the data session channel in a data transmission mode (Block 530). The data transmission mode is the mode in which the local device and the remote device exchange data while on the data session channel. Next, the process 500 determines if a timer interrupt occurs signaling a channel switching (Block 535). If so, the process 500 returns to Block 510 to operate in the control mode. Otherwise, the process 500 determines if the transmission mode is terminated (Block 540). The data transmission mode is terminated when the local device and the remote device complete their data exchange transaction. If not, the process 500 returns to block 530 to continue exchanging data with the remote device. Otherwise, the process 500 releases the data session channel to the network so that the data session channel is available for other network devices (Block 550). The process 500 is then terminated.

Figure 6:
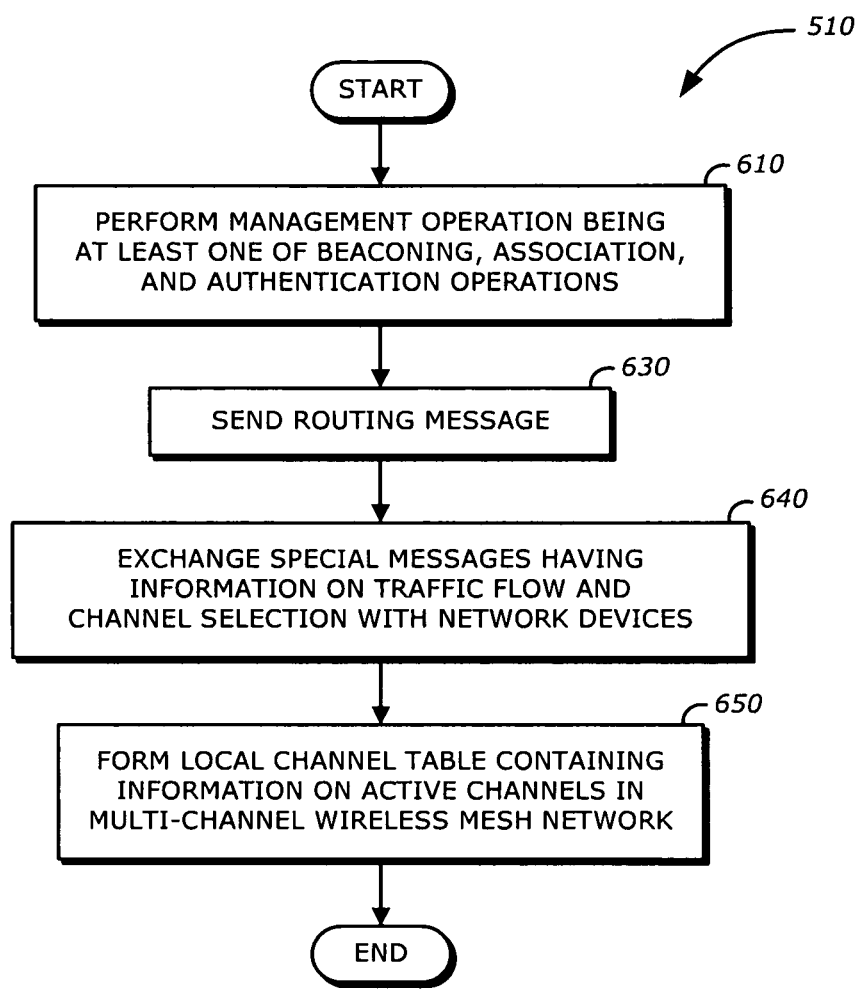
FIG. 6 is a flowchart illustrating a process to operate on a common channel for control purposes according to one embodiment.

FIG. 6 is a flowchart illustrating the process 510 shown in FIG. 5 to operate on a common channel for control purposes according to one embodiment.

Upon START, the process 510 performs a management operation being at least one of beaconing, association, and authentication operations (Block 610). It is contemplated that each individual sub-frame may be triggered by the timer interrupts. Next, the process 510 sends a routing message (Block 630). In one embodiment, all the control and data information is structured using super frame which may have a format as shown in FIG. 3B. The format may reserve time for a non-mesh data frame to communicate with a non-mesh device.

Then, the process 510 exchanges special messages having information on traffic flow and channel selection with network devices (Block 640). The special message may include information regarding the availability, or vacancy, of the active channels such as receive and transmit powers, whether a data session channel has been released, etc. Next, the process 510 forms a local channel table containing information on active channels in the multi-channel wireless mesh network (Block 650). As discussed above, the local channel table may contain a sorted list of active channels that may be selected as the data session channel. The process 510 is then terminated.

Figure 7:
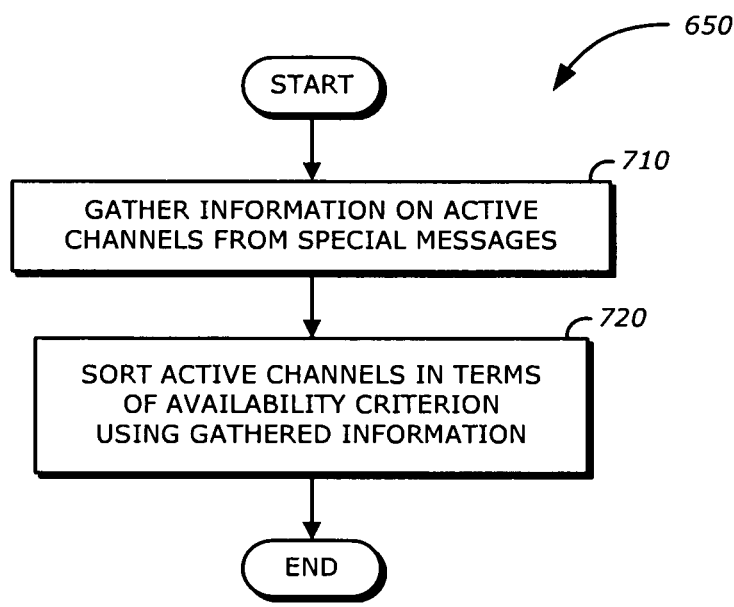
FIG. 7 is a flowchart illustrating a process to form a local channel table according to one embodiment.

FIG. 7 is a flowchart illustrating the process 650 shown in FIG. 6 to form the local channel table according to one embodiment.

Upon START, the process 650 gathers the information on the active channels from the special messages (Block 710). Then, the process 650 sorts the active channels in terms of an availability criterion using the gathered information (Block 720). The availability criterion may include traffic, receive and/or transmit powers, and interference. The process 650 is then terminated.

Figure 8:
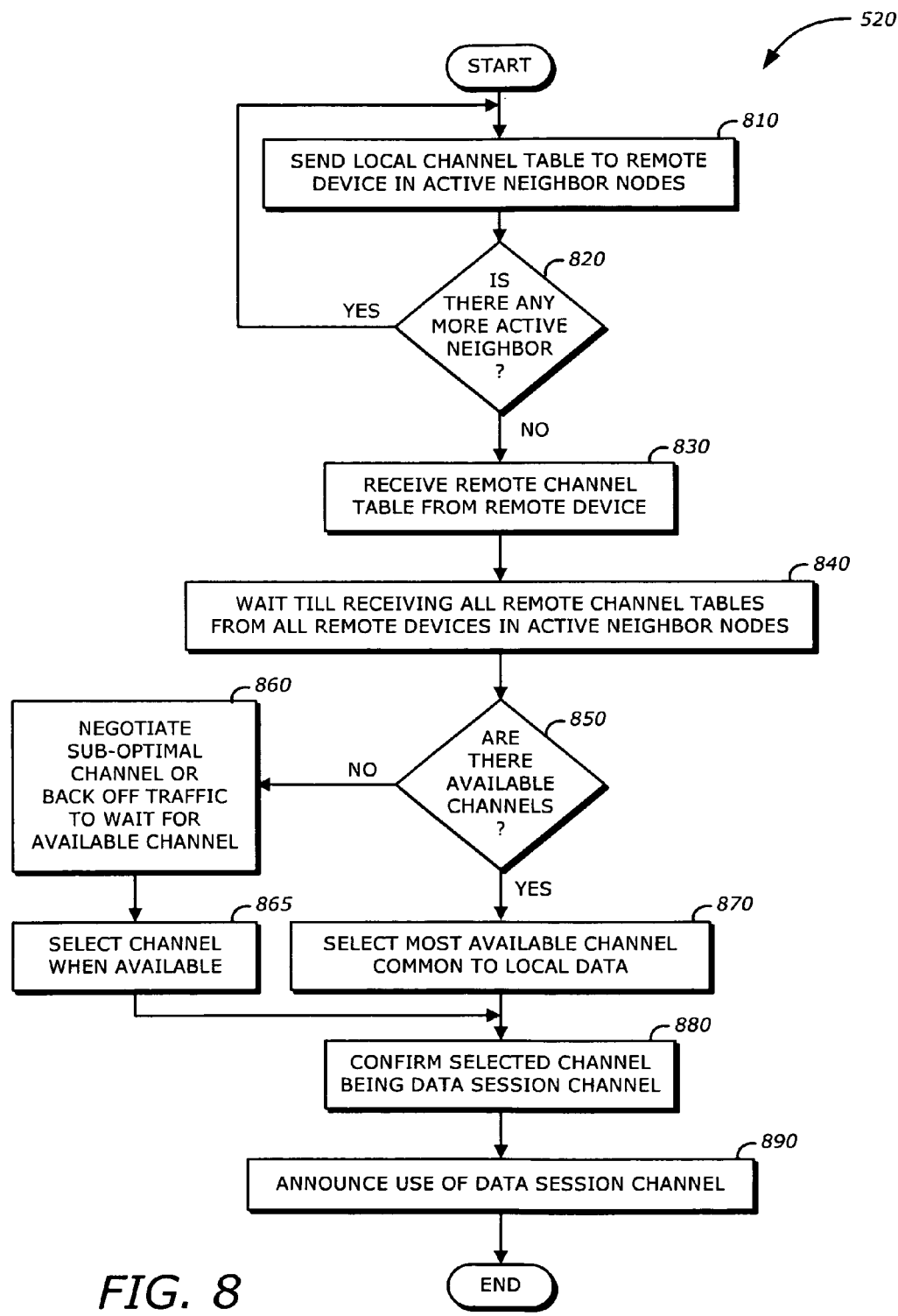
FIG. 8 is a flowchart illustrating a process to negotiate a data session channel according to one embodiment.

FIG. 8 is a flowchart illustrating the process 520 shown in FIG. 5 to negotiate a data session channel according to one embodiment.

Upon START, the process 520 sends the local channel table to the remote device (Block 810). Next, the process 520 determines if there is any more active neighbor (Block 820). An active neighbor is a node that is a neighbor of the local device and is active in the network. If there is still an active neighbor, the process 520 returns to Block 810. Otherwise, the process 520 receives the remote channel table from the remote device (Block 830). Then, the process 520 waits till all the remote channel tables from all the remote devices in the active neighbor nodes have been received (Block 840). Then, the process 520 determines if there are any available channels based on the received remote channel tables (Block 850). A channel is available when it is vacant or not in use. If there are no available or vacant channels, the process 520 negotiates a sub-optimal channel or back off the traffic to wait for an available channel (Block 860). Then, the process 520 selects a channel when it is successfully negotiated or when it is available (Block 865). The process 520 then proceeds to block 870. If there are available channels after the determination in Block 850, the process 520 selects a most available channel common to the local data channel and the remote channel table (Block 870).

Then, the process 520 confirms the selected channel being the data session channel (Block 880). Next, the process 520 announces use of the data session channel to other network devices in the network (Block 890). This may be done by sending a special message that contains the identifier of the selected data session channel. Other network devices, upon receipt of this special message, update their local channel tables to reflect the channel availability of the active channels. The process 520 is then terminated.

Figure 9:
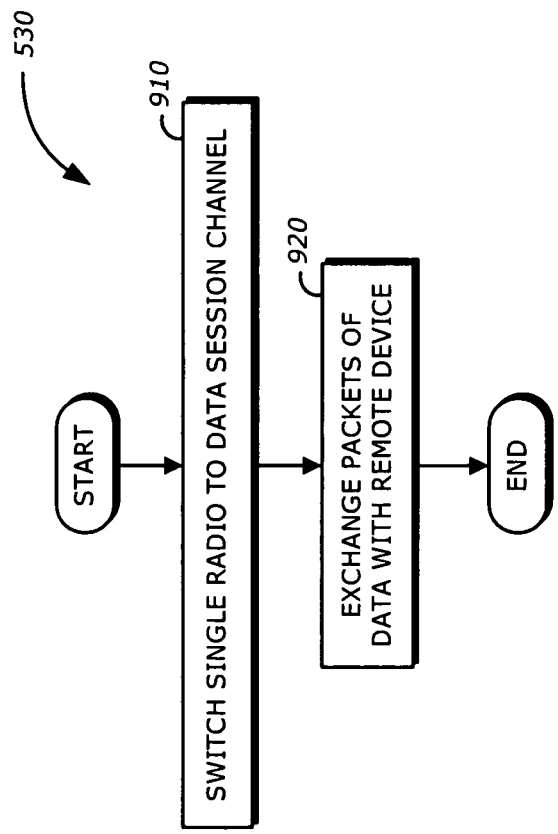
FIG. 9 is a flowchart illustrating a process to exchange data according to one embodiment.

FIG. 9 is a flowchart illustrating the process 530 shown in FIG. 5 to exchange data according to one embodiment.

Upon START, the process 530 switches the single radio to the data session channel (Block 910). In one embodiment, this may be performed by the channel selection module 420 under the control of the control module 410 and/or the timing module 470 as shown in FIG. 4. Next, the process 530 exchanges packets of data with the remote device (Block 920). The process 530 is then terminated.

Figure 10:
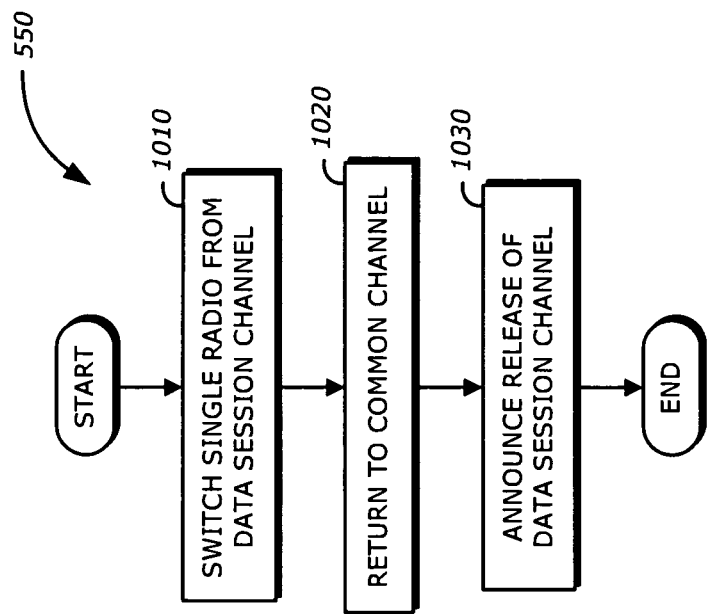
FIG. 10 is a flowchart illustrating a process to release the data session channel according to one embodiment.

FIG. 10 is a flowchart illustrating the process 550 shown in FIG. 5 to release the data session channel according to one embodiment.

Upon START, the process 550 switches the single radio from the data session channel (Block 1010). In one embodiment, this may be performed by the channel selection module 420 under the control of the control module 410 and the timing module 470 as shown in FIG. 4. Next, the process 550 returns to the common channel (Block 1020). The channel switching may be done by the channel selection module 420 (FIG. 4). Then, the process 550 announces release of the data session channel (Block 1030). This may be done by sending a special message to other network devices in the network indicating that the data session channel is no longer used and may be available for other communication sessions. The process 550 is then terminated.

Elements of one embodiment may be implemented by hardware, firmware, software or any combination thereof. The term hardware generally refers to an element having a physical structure such as electronic, electromagnetic, optical, electro-optical, mechanical, electromechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. Device comprising:
   at least one transceiver;
   at least one processor configured to communicate with the transceiver;
   at least one computer memory device storing instructions which when executed by the processor configure the processor for:
   using a common channel in a multi-channel wireless network to perform at least one control function with at least one target device;
   negotiating, over the common channel, a data session channel with the target device, the data session channel being different than the common channel;
   exchanging data packets with the target device using the data session channel; and
   establishing a local channel table containing information on active data channels in the network, wherein local channel table includes a figure of merit (FoM) for each candidate data channel reflecting a quantitative measure of the respective channel, at least first and second nodes exchanging local channel tables and using the figures of merit to establish the data channel.

2. The device of claim 1 wherein using the common channel comprises:
   performing a management operation being at least one of beaconing, association, and authentication operations;
   sending a routing message;
   exchanging special messages having information on traffic flow and channel selection with network devices; and
   forming a local channel table containing information on active channels in the network.

3. The device of claim 2 wherein forming the local channel table comprises:
   gathering the information on the active channels from the special messages; and
   sorting the active channels in terms of an availability criterion using the gathered information.

4. The device of claim 2 wherein negotiating comprises:
   sending the local channel table to the target device;
   receiving the remote channel table from the target device;
   selecting a most available channel common to the local data channel and the remote channel table;
   confirming the most available channel being the data session channel; and
   announcing use of the data session channel.

5. The device of claim 1 wherein exchanging data comprises:
   switching the transceiver to the data session channel; and
   exchanging packets of the data with the target device.

6. The device of claim 1 wherein the instructions when executed by the processor further configure the processor for releasing the data session channel after the data transmission mode is terminated.

7. The device of claim 6 wherein releasing the data session channel comprises:
   switching the transceiver from the data session channel;
   returning to the common channel; and
   announcing release of the data session channel.

8. The device of claim 1 wherein negotiating further comprises negotiating a sub-optimal channel or backing off traffic to wait for an available channel if there is no vacant channel.

9. The device of claim 1 wherein the data session channel is extended from the common channel to accommodate a non-mesh device.

10. The device of claim 1 wherein the network conforms to an 802.11 standard.

11. An article of manufacture comprising:
a non-transitory machine-accessible storage medium including data that, when accessed by a machine, cause the machine to perform operations comprising:
using a common channel in a multi-channel wireless network to perform at least one control function with at least one target device;
negotiating, over the common channel, a data session channel with the target device, the data session channel being different than the common channel; and
exchanging data packets with the target device using the data session channel, and
establishing a local channel table containing information on active data channels in the network, wherein local channel table includes a figure of merit (FoM) for each candidate data channel reflecting a quantitative measure of the respective channel, at least first and second nodes exchanging local channel tables and using the figures of merit to establish the data channel.

12. The article of manufacture of claim 11 wherein using the common channel comprises:
performing a management operation being at least one of beaconing, association, and authentication operations;
sending a routing message;
exchanging special messages having information on traffic flow and channel selection with network devices; and
forming a local channel table containing information on active channels in the network.

13. The article of manufacture of claim 12 wherein forming the local channel table comprises:
gathering the information on the active channels from the special messages; and
sorting the active channels in terms of an availability criterion using the gathered information.

14. The article of manufacture of claim 12 wherein negotiating comprises:
sending the local channel table to the target device;
receiving the remote channel table from the target device;
selecting a most available channel common to the local data channel and the remote channel table;
confirming the most available channel being the data session channel; and
announcing use of the data session channel.

15. The article of manufacture of claim 11 wherein exchanging data comprises:
switching the transceiver to the data session channel; and
exchanging packets of the data with the target device.

16. The article of manufacture of claim 11 wherein the using the common channel includes communicating at least one frame structure including at least three frames or fields, namely, a control frame, a non-mesh frame, and a mesh data frame, the control frame including one or more of beacon, synchronization, timing, discovery messages, the non-mesh frame including data pertaining to non-mesh devices in the network, the mesh data frame including data pertaining to mesh devices in the network, at least some of the data being operable to implement a network communication mode change from ad-hoc mode to managed mode.

17. The article of manufacture of claim 16 wherein releasing the data session channel comprises:
switching the transceiver from the data session channel;
returning to the common channel; and
announcing release of the data session channel.

18. The article of manufacture of claim 11 wherein negotiating further comprises negotiating a sub-optimal channel or backing off traffic to wait for an available channel if there is no vacant channel.

19. Method comprising:
using a common channel in a multi-channel wireless network to perform at least one control function with at least one target device;
negotiating, over the common channel, a data session channel with the target device, the data session channel being different than the common channel and being orthogonal thereto;
exchanging data packets with the target device using the data session channel; and
establishing a local channel table containing information on active data channels in the network, wherein local channel table includes a figure of merit (FoM) for each candidate data channel reflecting a quantitative measure of the respective channel, at least first and second nodes exchanging local channel tables and using the figures of merit to establish the data channel.

20. The method of claim 19 wherein using the common channel comprises:
performing a management operation being at least one of beaconing, association, and authentication operations;
sending a routing message; and
exchanging special messages having information on traffic flow and channel selection with network devices.

21. The method of claim 20 wherein establishing the local channel table comprises:
gathering the information on the active channels from the special messages; and
sorting the active channels in terms of an availability criterion using the gathered information.

22. The method of claim 19 wherein negotiating comprises:
sending the local channel table to the target device;
receiving the remote channel table from the target device;
selecting a most available channel common to the local data channel and the remote channel table;
confirming the most available channel being the data session channel; and
announcing use of the data session channel.

23. The method of claim 19 wherein exchanging data comprises:
switching the transceiver to the data session channel; and
exchanging packets of the data with the target device.

24. The method of claim 19, comprising releasing the data session channel after the data transmission mode is terminated.

25. The method of claim 24 wherein releasing the data session channel comprises:
switching the transceiver from the data session channel;
returning to the common channel; and
announcing release of the data session channel.

26. The method of claim 19 wherein negotiating further comprises negotiating a sub-optimal channel or backing off traffic to wait for an available channel if there is no vacant channel.

* * * * *